Figure 1:
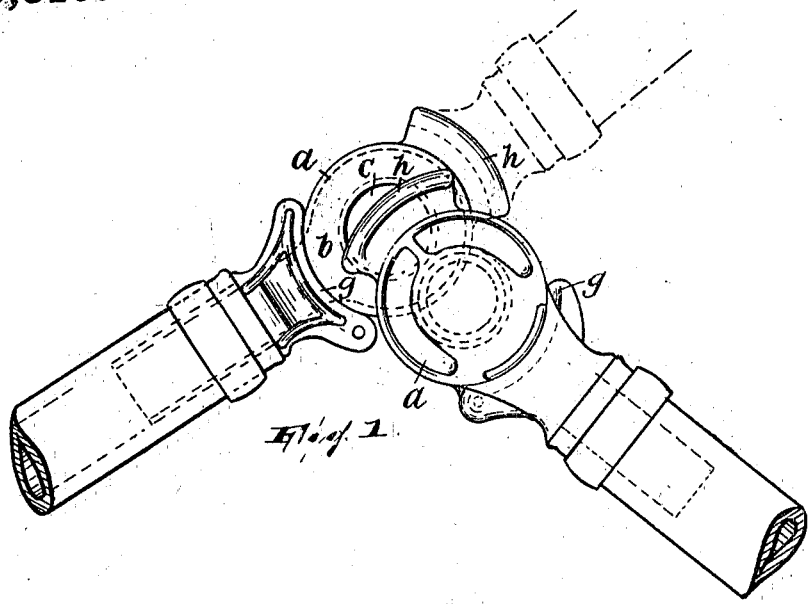

UNITED STATES PATENT OFFICE.

PERCIVAL R. SCHUYLER, OF PATERSON, NEW JERSEY.

PIPE-COUPLING.

1,059,319.  Specification of Letters Patent.  Patented Apr. 15, 1913.

Application filed October 18, 1912. Serial No. 726,451.

*To all whom it may concern:*

Be it known that I, PERCIVAL RAYMOND SCHUYLER, a citizen of the United States, residing at Paterson, in the county of Passaic and State of New Jersey, have invented certain new and useful Improvements in Pipe-Couplings, of which the following is a specification.

This invention relates to hose couplings and particularly to a common type of hose coupling, used in air-brake systems and the like, wherein the coupling members (counterparts of each other) are interlocked by first placing them face to face with their mouths in registry and then turning one or the other or both on the axis of their mouths to force the projection on each under the cam on the other, the seal being formed by elastic means at their mouths which is compressed by the cams forcing each member toward the other.

In place of the now universally employed sealing means consisting of two gaskets (set one in each coupling member) having cylindrical projecting portions held by the coupled members abutting end to end—a construction generally known to be far from leak-proof, partly because in its very nature it involves a joint (where the ends of the gaskets abut each other) to be perfectly sealed and partly because it encourages undue wear and injury in the coupling operation with respect to the meeting faces of the gaskets—I have found it of great advantage to use an intermediary between the members which shall be unitary, that is, jointless, in character; this I form as an expansible elastic gasket which is suitably secured in and adapted to form a hermetic seal with one member and formed to project into the other. In view of certain conditions existing in the operation and manipulation of the parts of fluid-conducting systems of the kind indicated above (systems conveying air or similar elusive fluids under high pressures, and requiring to be established and disestablished more or less frequently), such as the tendency of the fluid on the initial inrush to dislocate separable parts or to blow out such parts when a coupling is disestablished, and the necessity, or at least the desideratum, of so forming the gasket that it shall be as little as possible subject to wear, and as much as possible capable of resisting wear, incident to the operations of connecting and disconnecting the coupling members, and that it shall encourage rather than interfere with the facile performance of such operations, and particularly the former, I have found it further advantageous to form the projecting portion of the gasket as a thick-set, low-lying nose; this nose is preferably of such dimension that it protrudes through and somewhat beyond the internal continuous lip which is formed at the terminal of the passage of the coupling member into which said nose projects, whereby the pressure on acting to expand the gasket will cause the nose to be flared or curled outwardly around the said lip and thus increase the extent of the contact between them, and said nose preferably is conical in form so as to come to bear circumferentially thereof against said seat on coupling and before pressure is admitted, and it has an exterior continuous flange to intervene and be compressed between the opposed faces of the coupling members and thus augment the sealing effect.

Figures 2, 4:
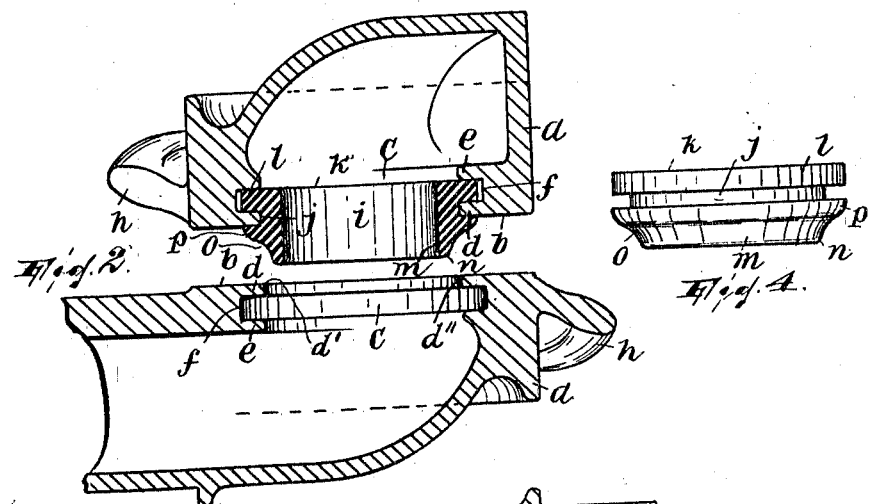
Figure 3:
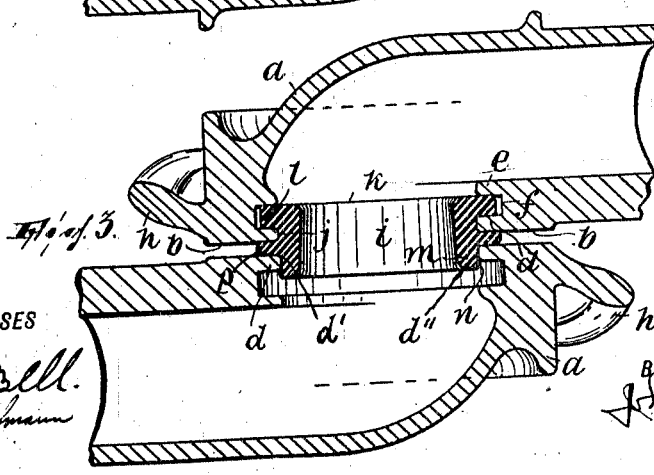

The invention will now be explained in detail, reference being had to the accompanying drawing, wherein, Figure 1 is a plan view of the improved coupling, the members of which are shown about to be assembled; Fig. 2 is a sectional view through the coupling members which are shown separated but positioned with their mouths opposite each other; Fig. 3 is a similar view showing the members assembled; and, Fig. 4 is a side elevation of the improved sealing device.

The coupling members $a$ $a$ are of the usual construction, having the flat adjoining faces $b$ $b$ provided with the circular mouths $c$ $c$ each having an internal circumferential lip $d$ whose outer face is flush with the outer face $b$ of the member $a$ and whose inner or cylindrical surface forms a sealing seat with which the projecting nose of a gasket of the kind hereinafter described may have sealing contact and a similar lip $e$ set back within the mouth in spaced relation to lip $d$ to form therewith an internal circumferential groove $f$; as usual, the lip $d$ is preferably rectangular in cross-section. Each member has, as usual, the diametrically opposite projection $g$ and cam $h$ to coact, respectively, with the cam and projection on the other member in interlocking them and forming the seal.

In the present instance, but a single device constituting the elastic seal-forming means is employed; it is adapted to be applied to either of the members. This device may be described thus: It is an annular body of rubber or the like formed with its bore $i$ preferably rounded at the ends thereof and having an exterior cross-sectionally rectangular circumferential groove $j$ of such width and sufficiently spaced from the base $k$ of said body that, when the latter is applied in position in one of the members, whose mouth it snugly fits, the lip $d$ of said member closely fits said groove $j$ while the flange $l$ back of said groove $j$ closely fits said groove $f$ of said member. Forward of said groove $j$ said annular elastic body has an extended but thick-set, low-lying nose $m$ which is rounded at its extremity (as at $n$), the nose-including portion of said body being exteriorly generally conical but formed with a more or less shallow circumferential channel $o$ producing on said body, forward of groove $j$, the flange $p$, whose diameter is thus appreciably greater than that of the mouth of either of the coupling members $a$ $a$.

Thus constructed, and arranged in one of the coupling members in the way explained above, the sealing device or body acts as follows: In assembling the members they are brought into proper position for effecting the articulation thereof necessary to interlock them and produce the seal by placing the member carrying the sealing device in face to face relation to the other member, with the nose of said device entered into the mouth of the latter member. On effecting the articulation of the members, or either of them, the sealing device maintains the members properly centered with relation to each other. Under the compressing action of the projections and cams $g$ and $h$ of said members the flange $p$ of the sealing device becomes squeezed between the adjoining faces $b$ $b$ of said members, and incidentally the edge $d'$ of the lip $d$ of the lower member in Figs. 3 and 4, by contact with the conical outer surface of the nose of said device, acts to displace toward the base $k$ the superficial portion of said nose, so that the latter is expanded and thereby made to hug the inner cylindrical surface $d''$ of said lip $d$ (Fig. 3). In this way, regardless of the effect of interior pressure, the sealing contact between the sealing device and the lower member is made substantially equivalent to that between the sealing device and the upper member existing at lip $e$ as well as lip $d$ thereof. The thick-set low-lying formation of the nose greatly facilitates "finding" the centered relation of the members in coupling them together, besides giving the gasket sufficient stability not only to withstand the wear and tear incident to that operation but to resist its being dislocated or distorted by the pressure. When, now, the pressure becomes operative within the coupling the sealing effect will, if anything, be augmented thereby, due to the pressure tending to force the material of the sealing device outwardly through the crevice formed between the faces $b$ $b$ of the members $a$ $a$, with a consequent bunching or massing of said material at the annular approach to said crevice, and at the same time expanding the nose $m$, already (as stated) flaring and hugging the lip $d$ through which it protrudes, into increased contact with said lip.

Having thus fully described my invention, what I claim as new and desire to secure by Letters Patent is:—

1. In combination, with separably interlocked counterpart coupling members having passages therethrough terminating in the most relatively approximate portions of said members in opposition to each other, the terminal of each passage forming a continuous sealing seat, an elastic expansible annular gasket held by one member in the terminal of its passage and having a relatively low-lying thick-set continuous nose projecting into and adapted circumferentially thereof to form a seal with the sealing seat of the other member under the influence of internal pressure to expand said gasket, substantially as described.

2. In combination, with separably interlocked counterpart coupling members having passages therethrough terminating in the most relatively approximate portions of said members in opposition to each other, the terminal of each passage forming a continuous sealing seat, an elastic expansible annular gasket held by one member in the terminal of its passage and having a relatively low-lying thick-set conical continuous nose projecting into and being exteriorly thereof in continuous sealing contact with the sealing seat of the other member, substantially as described.

3. In combination, with separably interlocked counterpart coupling members having passages therethrough terminating in the most relatively approximate portions of said members in opposition to each other, the terminal of each passage forming a continuous sealing seat, an elastic expansible annular gasket held by one member in the terminal of its passage and having a relatively low-lying thick-set conical continuous nose projecting into and being exteriorly thereof in continuous sealing contact with the sealing seat of the other member, said nose having an exterior annular flange held compressed between the opposite faces of said members, substantially as described.

4. In combination, with separably interlocked counterpart coupling members having passages therethrough terminating in the most relatively approximate portions of said members in opposition to each other, the terminal of each passage being an inwardly projecting annular lip, and an elastic expansible annular gasket held by one member in the terminal of its passage and having a relatively low-lying thick-set continuous nose projecting through and relatively beyond said lip and adapted to form therewith a continuous seal under the influence of internal pressure to expand said gasket, substantially as described.

In testimony whereof I affix my signature in presence of two witnesses.

P. R. SCHUYLER.

Witnesses:
JOHN W. STEWARD,
WM. D. BELL.

Copies of this patent may be obtained for five cents each, by addressing the "Commissioner of Patents, Washington, D. C."